(12) United States Patent
Hendriks

(10) Patent No.: US 7,172,797 B2
(45) Date of Patent: Feb. 6, 2007

(54) OPTICAL INFORMATION MEDIUM AND A METHOD OF MANUFACTURING THE MEDIUM

(75) Inventor: Bernardus Hendrikus Wilhelmus Hendriks, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1068 days.

(21) Appl. No.: 10/042,660

(22) Filed: Jan. 9, 2002

(65) Prior Publication Data

US 2002/0132082 A1 Sep. 19, 2002

(30) Foreign Application Priority Data

Jan. 25, 2001 (EP) .................................. 01200274

(51) Int. Cl.
*B32B 3/02* (2006.01)
(52) U.S. Cl. .................. 428/64.1; 428/64.4; 428/64.5; 430/270.13
(58) Field of Classification Search ............... 428/64.1, 428/64.4, 64.5; 430/270.13
See application file for complete search history.

(56) References Cited

U.S. PATENT DOCUMENTS 6,379,767 B1 * 4/2002 Park et al. ................. 428/64.1
6,528,138 B2 * 3/2003 Meinders et al. .......... 428/64.1
6,861,117 B2 * 3/2005 Rijpers et al. ............. 428/64.1

FOREIGN PATENT DOCUMENTS

DE 19927714 A 12/1999
EP 1047055 A1 10/2000

OTHER PUBLICATIONS

Narahara et al., "Optical Disc System For Digital Video Recording," Japanese Journal Of Applied Physics, Publication Office Japanese Journal Of Applied Physics. Tokyo, JP, vol. 39, No. 2B, Part 1, Nov. 7, 1999, pp. 912-919.

* cited by examiner

*Primary Examiner*—Rena L. Dye
*Assistant Examiner*—Elizabeth Mulvaney

(57) ABSTRACT

An optical information medium (20) for recording, such as DVR-blue, and a method for manufacturing such a medium (20) is provided. Reading from and recording onto the medium (20) is performed by means of a focused radiation beam (10) having a radiation wavelength $\lambda$ and a numerical aperture NA. Said medium has a substrate (1), and a stack (2) of layers provided thereon. The stack (2) comprises at least a first recording stack (3) and k radiation beam transmissive layers (4, 5). Each transmissive layer (4, 5) has a refractive index $n_i$ and an average thickness $d_i$ μm and $1 \leq i \leq k$ and $k \geq 2$. The thickness $d_k$ of layer k (5) is determined by a simple formula which depends on the parameters $n_i$ for i=1 ... k and $d_i$ for i=1 ... k-1. Such a medium (20) has zero or substantially zero spherical aberration at the focal point, being at the recording layer of the first recording stack (3), of said radiation beam (10).

13 Claims, 3 Drawing Sheets

OPTICAL INFORMATION MEDIUM AND A METHOD OF MANUFACTURING THE MEDIUM

BACKGROUND OF THE INVENTION

The invention relates to an optical information medium for recording by means of a focused radiation beam having a radiation wavelength λ and a numerical aperture NA, said medium having a substrate, a stack of layers provided thereon, the stack comprising at least a first recording stack and k radiation beam transmissive layers, each radiation beam transmissive layer having a refractive index $n_i$ and an average thickness $d_i$ μm and $1 \leq i \leq k$ and $k \geq 2$.

The invention further relates to a method of manufacturing such an optical information medium.

An embodiment of such an optical recording medium is known from European patent application EP-A-1047055. In particular the application of a light transmissive adhesive layer in order to bond cover layers or other layers to each other, to the surface of a substrate and/or to one or more information storage layers is described.

There is a constant drive for obtaining optical storage media suitable for recording and reproducing, which have a storage capacity of 8 Gigabyte (GB) or larger. This requirement is met by some Digital Video Disc or sometimes also Digital Versatile Disc formats (DVD). DVD formats can be divided into DVD-ROM that is exclusively for reproduction, DVD-RAM, DVD–RW and DVD+RW, which are also usable for rewritable data storage, and DVD-R, which is recordable once. Presently the DVD formats comprise discs with capacities of 4.7 GB, 8.5 GB, 9.4 GB and 17 GB.

The 8.5 GB and, in particular, the 9.4 GB and 17 GB formats exhibit more complicated constructions and usually comprise multiple information storage layers. The 4.7 GB single layer re-writable DVD format is easy to handle comparable, for example, to a conventional CD (compact disc) but offers an insufficient storage capacity for video recording purposes.

A high storage capacity format that recently has been suggested is Digital Video Recordable disc (DVR). Two formats are currently being developed: DVR-red and DVR-blue, where red and blue refer to the used radiation beam wavelength for recording and reading. This disc overcomes the capacity problem and, in its simplest form, has a single storage layer format which is suitable for high density digital video recording and storage having a capacity up to 22 GB in the DVR-blue format.

The DVR disc generally comprises a disc-shaped substrate exhibiting on one or both surfaces an information storage layer. The DVR disc further comprises one or more radiation beam transmissive layers. These layers are transmissive to the radiation beam that is used to read from or write into the disc. For example a transmissive cover layer, which is applied on the information storage layer. Generally, for high-density discs, lenses with high numerical aperture (NA), e.g. higher than 0.60, are used for focusing such a radiation beam with a relatively low wavelength. For systems with NA's above 0.60 it becomes increasingly difficult to apply substrate incident recording with substrate thicknesses in the 0.6–1.2 mm range due to decreasing tolerances on e.g. thickness variations and disc tilt. For this reason, when using discs that are recorded and read out with a high NA, focusing onto a recording layer of a first recording stack, is performed from the side opposite from the substrate. Because the first recording layer has to be protected from the environment at least one relatively thin radiation beam transmissive cover layer, e.g. thinner than 0.5 mm, is used through which the radiation beam is focused. Clearly the need for the substrate to be radiation beam transmissive no longer exists and other substrate materials, e.g. metals or alloys thereof, may be used.

In case second or further recording stacks are present a radiation beam transmissive spacer layer is required between the recording stacks. The second and further recording stacks must be at least partially transparent to the radiation beam wavelength in order to making writing in and reading from the recording layer of the first recording stack possible. The thickness of such spacer layers typically is from the order of tens of micrometers. The radiation beam transmissive layer or layers which are present between the radiation beam source and the recording stack that is most remote from the substrate are normally called cover layers. When prefabricated sheets are used as transmissive layers extra transmissive adhesive layers are required in order to bond cover layers to each other.

In the DVR disc the variation or unevenness of the thickness of the radiation beam transmissive layers over the radial extension of the disc has to be controlled very carefully in order to minimize the variation in the optical path length for the impinging radiation. Especially the optical quality of the radiation beam at the focal point in the DVR-blue version, which uses a radiation beam with a wavelength substantially equal to 405 nm and an NA substantially equal to 0.85, is relatively sensitive to variations in the thickness of the transmissive layers. The total layer thickness has an optimal value in order to obtain minimum optical spherical aberration of the focused radiation beam on, e.g., the first information recording layer. A slight deviation, e.g. +/−2 μm, from this optimal thickness already introduces a considerable amount of this kind of aberration. Because of this small range it is important that the average thickness of the transmissive layers is equal to or close to its optimal thickness in order to make optimal use of the tolerances of the system and to have a high yield in manufacturing the disc. Assuming that a thickness error is Gaussian distributed around the nominal setting of the thickness, it is clear that the number of manufactured discs which do not comply with the above specification is minimal when the target setting of the nominal thickness during manufacture is substantially equal to the optimal thickness of the cover layer as in the specification of the DVR disc. The nominal thickness of a single layer cover of the DVR disc is 100 μm when the refractive index of the cover layer is n=1.6. The nominal thickness of the cover layer has to be adjusted when using a different refractive index. Since a change in optimal thickness can exceed more than one micron, it is clear from the point of view of yield that even this small change has to be taken into account. Because of the high numerical aperture of the read- and write system such a change in optimal cover layer thickness, when the refractive index is different, can not accurately be predicted using e.g. third order Seidel aberration analysis. Therefore higher order analysis or ray tracing methods have to be used. Let D(n) be defined as the optimal thickness of the single cover layer as a function of the refractive index, hence, for the proposed thickness, D(1.6)=100 μm. Since this is a one parameter function, it has to be calculated once, and can be presented in a single graph. A problem now arises when considering multi transparent layer discs. As described earlier multi-layer discs are used to allow for e.g. dual-layer readout. Furthermore, from EP-A-1047055 it is known to use a polymer layer such as, for example, a polycarbonate (PC) sheet as light-transmissive cover layer and adhere such layer to the information storage layer by means of a thin, spin-coated layer of a UV curable liquid resin or a pressure sensitive adhesive (PSA). Because the disc now is built up of more than one radiation beam transmissive layer it becomes even more difficult to manufacture the disc which varies within the above specified range. Hence for such a disc it is even more important to set the nominal thicknesses substantially equal to the optimal nominal thicknesses of the multiple cover layer of the disc. Because this is now a multi-variable function it can not be presented in a few simple graphs. A way to solve this problem is using ray-trace methods. The problem is now that every manufacturer of optical discs, who applies transparent layers with deviating refractive indices, must calculate the optimal thickness itself since it is not known beforehand. An essential element in the ray-trace formalism is that the designer has to define the correct merit function that the ray trace program needs in order to correctly optimize one or more transparent layers of the disc. This requires a skilled optical designer, and the above way is susceptible for errors.

SUMMARY OF THE INVENTION

It is an object of the invention to provide an optical information medium of the kind described in the opening paragraph, having k radiation beam transmissive layers of substantially uniform thickness, with $k \geq 2$, and in which the $k^{th}$ radiation beam transparent layer has an average thickness which causes the focused radiation beam to have a spherical aberration zero or substantially equal to zero at the focal point of said beam.

It is another object of the invention to provide a method of manufacturing such an optical information medium.

The first object is achieved in that the average thickness $d_k$ of radiation beam transparent layer k is determined by the formula $$d_k = D(n_k)\left[1 - \sum_{i=1}^{k-1} \frac{d_i}{D(n_i)}\right] \pm 0.01 D(n_k) \text{ and } \sum_{i=1}^{k-1} \frac{d_i}{D(n_i)} < 1,$$

and $D(n)$ representing the thickness versus refractive index function of a single layer radiation beam transmissive layer causing minimal spherical wavefront aberration in the focal point of the focused radiation beam, said focal point being at the recording layer of the first recording stack.

It has been found that the optimal thickness of the radiation beam transmissive layer k can very accurately be determined with this simple formula in dependency of the other k−1 radiation beam transmissive layers. The word other already implies that layer k is not necessarily deposited last. It may well be that layer k is an intermediate radiation beam transmissive layer, e.g. a layer which is deposited in liquid form and solidified afterwards, in between the k−1 other radiation beam transmissive layers. Such a liquid layer has the advantage that its thickness may be varied and optimized by varying e.g. the rotation speed of the substrate during spincoating of such a layer. With a layer k of this optimal thickness zero or substantially zero spherical aberration is obtained at the focal point of the radiation beam.

The function $D(n)$ only needs to be determined only once for a single layer radiation beam transmissive layer, not according to the invention, at the used radiation beam wavelength and at the NA of the lens that is used for reading from and writing into the optical information medium. Having zero or low spherical aberration at said focal point leaves more tolerance for errors in parts of the optical, electrical and mechanical system which reads data from and/or writes data into the optical information medium. For instance disc tilt, lens tilt, lens contamination, lens defocusing, mark jitter all have a deteriorating effect on the read- and writability of the disc. Having the transmissive stack at optimal thickness stretches the margins for these other parameters, which results in a more robust system. Experiments have shown that the thickness determined with the formula above is substantially equal to the real theoretical optimal value of the thickness, that is within 0.1% of this value. In order to make the formula of practical use a bandwidth of +/−0.01$D(n_k)$ is allowed in which the average thickness $d_k$ should lie. The preferred $d_k$ is targeted in the middle of this bandwidth in order to have the best possible benefit from the formula.

In a preferred embodiment the refractive index $n_i$ of each of the radiation beam transmissive layers satisfies $1.45 \leq n_i \leq 1.70$. According to ongoing standardization discussions this condition has to be fulfilled for the DVR-blue disc. In order to prevent undesirable reflections at the interface of adjacent radiation beam transmissive layers the difference in refractive index of these adjacent layers should be kept small. Within the specified range of refractive indices the maximum reflection (R) at the interface of a layer with a refractive index of 1.45 and a layer with a refractive index of 1.70, for a radiation beam perpendicular to the plane of the interface, is deductible from the laws of electromagnetic theory and amounts to:

$$R = \left(\frac{1.70 - 1.45}{1.70 + 1.45}\right)^2 = 0.0063 \text{ which is far less than } 1\%.$$

Most organic transmissive layers fall within the specified range.

In a specific embodiment $D(1.60)=100$ μm. The thickness function $D(n)$ representing the optimal thickness of a hypothetical single cover layer, not according to the invention, has a value of 100 μm at a refractive index of 1.60. It has been agreed for the DVR-blue format that the condition of $D(n)$ mentioned in the previous sentence is fulfilled.

The single cover layer thickness should be adjusted to a different value when the refractive index of the single cover layer has a value different from 1.60. The level of adjustment depends on the optical specification, e.g. NA, of the lens that is used for focusing a radiation beam onto the recording layer.

In another embodiment $D(n)$ is represented by consecutive connection, with substantially linear line parts, of coordinates $(n, D(n))$ with the values (1.45, 98.5), (1.50, 98.6), (1.55, 99.2), (1.60, 100), (1.65, 101.1) and (1.70, 102.4). This defines the function $D(n)$ as specified in the DVR-blue format, which is optimized for an NA of 0.85 at a radiation beam wavelength of substantially 405 nm. This thickness function $D(n)$ should be used in the formula for $d_k$ according to the invention in case of a DVR-blue disc. The function is shown in FIG. 4.

In another embodiment $D(1.60)=300$ μm. The thickness function $D(n)$ representing the optimal thickness of a hypothetical single cover layer, not according to the invention, has a value of 300 μm at a refractive index of 1.60. In a possible high density DVD (HD-DVD) format the condition of $D(n)$ mentioned in the previous sentence is fulfilled. Possible structures for a HD-DVD format are: a 300 μm cover layer on a 900 μm substrate that includes a recording stack between the cover and the substrate or a 300 μm cover on both sides of a 600 μm substrate that includes a recording stack between the cover and the substrate on both sides of the substrate. In both cases the total disc thickness will be 1200 μm or 1.2 mm. The single cover layer thickness should be adjusted to a different value when the refractive index of the single layer cover has a value different from 1.60. The level of adjustment depends on the optical specification, e.g. NA, of the lens that is used for focusing a radiation beam onto the recording layer.

In another embodiment D(n) is represented by consecutive connection, with substantially linear line parts, of coordinates (n, D(n)) with the values (1.45, 303.8), (1.50, 301.0), (1.55, 299.9), (1.60, 300.0), (1.65, 301.1) and (1.70, 303.0). This defines the function D(n), as specified in the HD-DVD format, when optimized for an NA of substantially equal to 0.70 at a radiation beam wavelength of substantially equal to 405 nm. This thickness function D(n) should be used in the formula for $d_k$ in case of a HD-DVD disc according to the invention. The function is shown in FIG. 5.

In yet another embodiment the thickness $d_k$ of transparent layer k is determined by the formula $$d_k = D(n_k)\left[1 - \sum_{i=1}^{k-1} \frac{d_i}{D(n_i)}\right] \pm 0.001 D(n_k)\,\mu m.$$

The allowable bandwidth range of $d_k$ is reduced by a factor of ten. An optical information medium with a $d_k$ according to this formula generally fulfils the optimal condition of the formula even more closely and is therefore superior to the medium according to claim 1 with respect to its absence of spherical aberration of a focused radiation beam at its focal point at the first recording layer.

The second object is achieved in that a method of manufacturing an optical information medium according to the invention comprises the steps of providing a substrate, depositing a stack of layers thereon, the stack comprising at least one recording stack and k radiation beam transmissive layers, each transmissive layer having a refractive index $n_i$ and average thickness $d_i$ μm and $1 \leq i \leq k$ and $k \geq 2$. The thickness of the $k^{th}$ layer is determined by the formula for $d_k$ according to the invention. Radiation beam transmissive layers are usually deposited or applied by spincoating or laminating.

Additional auxiliary radiation beam transmissive layers may be present in the recording stack or stacks adjacent the first and/or further recording layers. These auxiliary layers serve in order to improve the recording properties of said recording layers, and usually have a thickness of the order of tens of nanometers. This is much smaller than the bandwidth that is allowed in claim 3 or 4 for a typical value D(n)≈100 μm. Therefore the thickness of those layers may safely be ignored and does not need to be used in the formula according to the invention. In case the bandwidth of claim 5 is used, thus 0.001D(n), the bandwidth is e.g. +/−0.1 μm, for D(n)≈100 μm, which still is considerably larger than a few tens of nanometers. In the exceptional case where an auxiliary radiation beam transmissive layer is thicker than a few tens of nanometers a it may be required to incorporate it in the formula for $d_k$ according to the invention as one of the k−1 other radiation transmissive layers.

Suitable recording stacks comprise phase change alloys as recording layers as described in U.S. Pat. Nos. 5,876,822 and 6,127,049 both filed by Applicants. These recording layers are of the erasable type. However, other types of recording layers, e.g. write once dyes, write once dye in polymers, erasable magneto optical layers or fluorescent layers, may also be used and are therefore not excluded.

BRIEF DESCRIPTION OF THE DRAWINGS

The optical information medium according to the invention will be elucidated in greater detail by means of three exemplary embodiments and with reference to the accompanying drawings, in which FIGS. 1, 2 and 3 each show a schematic cross-sectional view of an optical information medium in accordance with the invention. The dimensions are not drawn to scale.

DETAILED DESCRIPTION OF THE INVENTION

Exemplary Embodiment 1

Figure 1:
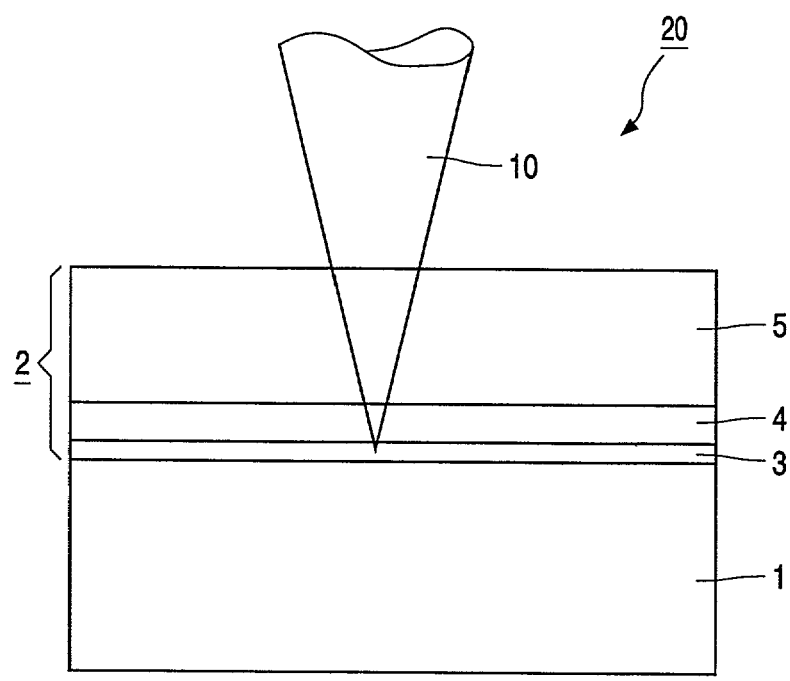
Figure 4:
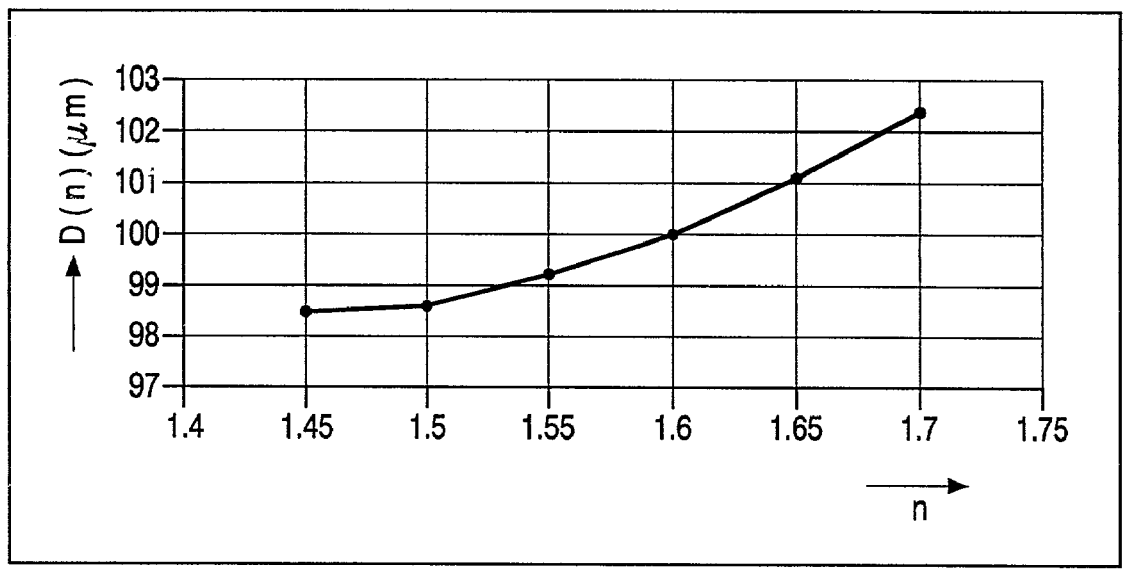
FIG. 4 shows the thickness function D(n) optimized for DVR-blue at a wavelength of 405 nm and an NA of 0.85.
Figure 5:
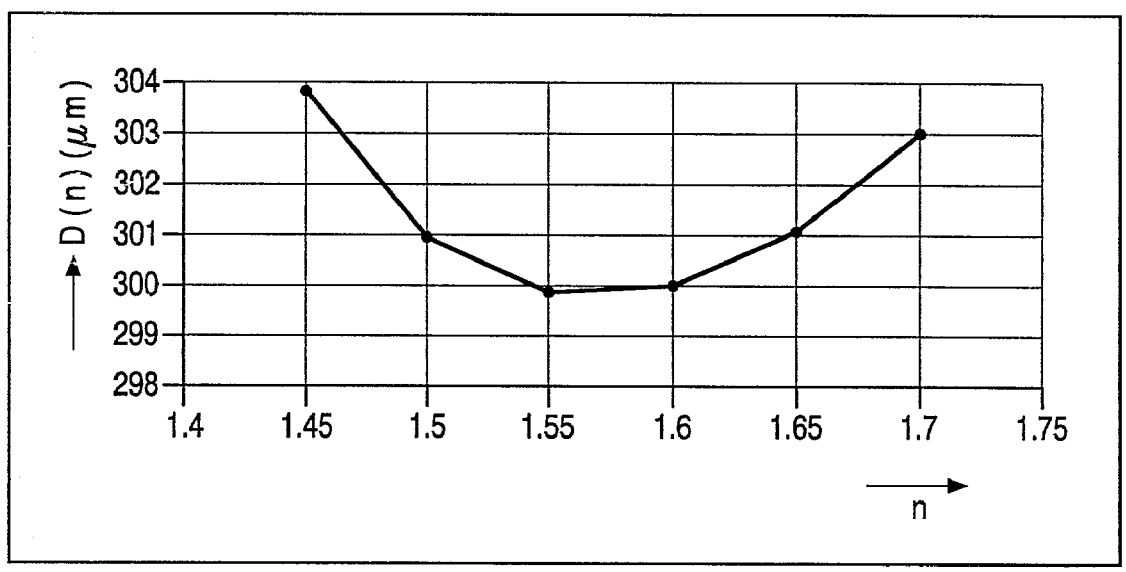
FIG. 5 shows the thickness function D(n) optimized for HD-DVD at a wavelength of 405 nm and an NA of 0.70.

In FIG. 1 a first exemplary embodiment, according to the DVR-blue format, of the optical information medium 20 for erasable recording is shown. A radiation beam 10, which has a radiation wavelength λ of 405 nm and a numerical aperture NA of 0.85, is focused into the medium 20. The medium 20 has a substrate 1 and a stack 2 of layers provided thereon. The stack 2 comprises a first recording stack 3 with an IPIM layer structure, in this order, in which I are dielectric layers made of $(ZnS)_{80}(SiO_2)_{20}$, P is a phase change alloy with the composition $Ge_{14}Sb_{28}Te_{58}$ and M is a metal mirror layer of aluminum (Al). The thicknesses of the layers in the IPIM recording stack 3 are 115 nm, 27 nm, 26 nm and 100 nm respectively. The Al layer is adjacent the substrate 1. The stack 2 further comprises two radiation beam transmissive layers 4, 5. First transmissive layer 4 is made of a UV curable resin, e.g. Daicure EX-860 provided by Dainippon Ink and Chemicals, and has a refractive index $n_1=1.52$ and an average thickness $d_1=4$ μm. The second radiation beam transmissive layer 5 is made of polycarbonate (PC) and has a refractive index $n_2=1.60$. The average thickness $d_2$ of the second transmissive layer 5 satisfies the equation:

$$d_2 = D(1.60)\left[1 - \frac{4}{D(1.52)}\right] \pm 0.01 D(1.60)\,\mu m,$$

$$\text{in which } \frac{4}{D(1.52)} < 1$$

and D(n) represents the thickness versus refractive index function in μm, of a single layer radiation beam transmissive layer causing minimal spherical wavefront aberration in the focal point of the focused radiation beam, said focal point being at the recording layer of the first recording stack 3. This function D(n) for the DVR-blue disc is represented by consecutive connection, with substantially linear line parts, of coordinates (n, D(n)) with the values (1.45, 98.5), (1.50, 98.6), (1.55, 99.2), (1.60, 100), (1.65, 101.1) and (1.70, 102.4). The function D(n) for DVR-blue is shown in FIG. 4. D(1.60)=100 μm and D(1.52)=98.84 μm, which value is determined by linear interpolation. This yields for $d_2$ the value 95.95 μm. The first radiation beam transmissive layer may be applied by dosing a circular bead of the UV curable resin on the substrate 1 that has an already deposited recording stack 3. The substrate 1 is mounted on a chuck of a spincoater. On top of the circular bead the second transmissive layer 5 consisting of a precut sheet of PC with a thickness of 95.95 μm is applied. Subsequently the substrate 1 is spun at a rotation speed of about 5000 rpm by which the UV curable resin is partially driven outside due to centrifugal forces and a resin layer 4 is formed between the PC sheet 5 and the recording stack 3. After spinning the resin layer 4 has a substantially uniform thickness. By varying the rotation speed of the substrate 1 the thickness of the resin layer 4 may be adjusted. Hereafter the resin is UV cured by exposure to a suitable UV source. The rotation speed, which renders a resin layer 4 with a thickness of 4 μm after curing with UV light, must be determined experimentally. The PC sheet 5 may require trimming in order to match the shape of the substrate 1. Thus the total thickness of the double cover layer is 99.95 μm being the sum of the thicknesses of the UV curable resin 4 and the PC sheet 5. As already indicated earlier the $k^{th}$ transmissive layer is not necessarily the deposited PC sheet 5 and may also be the UV curable layer 4. In this case a PC sheet 5 having a thickness of 96 μm, or any other commercially available thickness, may be chosen and the thickness of the UV curable layer 4 may subsequently be calculated with the formula according to the invention. However the method of depositing or applying layer 4 and 5 is the same as described above.

Exemplary Embodiment 2

Figure 2:
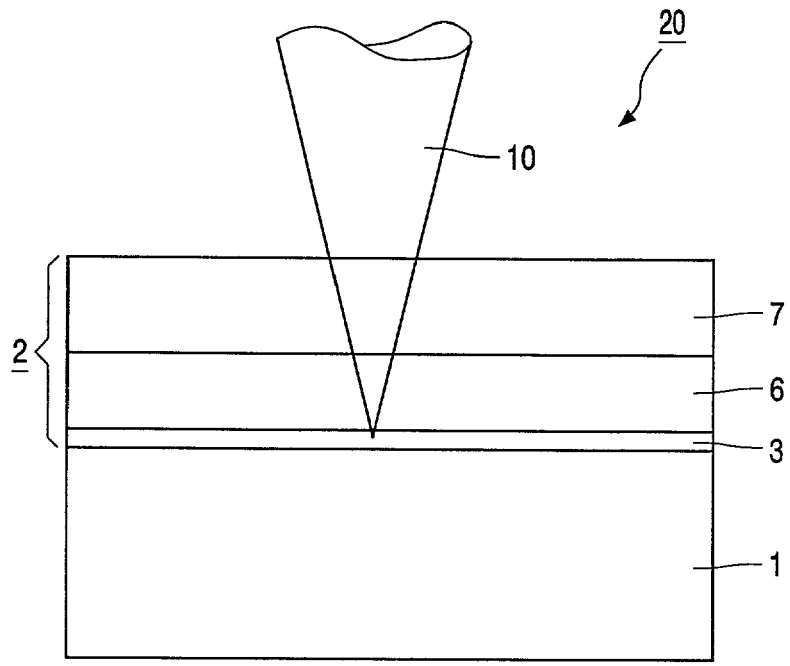

In FIG. 2 a second exemplary embodiment, according to the DVR-blue format, of the optical information medium 20 for erasable recording is shown. A radiation beam 10, which has a radiation wavelength λ of 405 nm and a numerical aperture NA of 0.85, is focused into the medium 20. The medium 20 has a substrate 1 and a stack 2 of layers provided thereon. The stack 2 comprises a first recording stack 3, which is identical to the stack 3 described in exemplary embodiment 1, and two radiation beam transmissive layers 6, 7. First transmissive layer 6 is made of a Pressure Sensitive Adhesive (PSA) layer that is commercially available by e.g. 3M. The PSA layer 6 may comprise a transparent backing and/or carrier layer such as, for example, optionally surface treated, amorphous polymer layers such as polyethylene terephtalate (PET), PC or polymethylmethacrylate (PMMA) layers carrying on each side an adhesive layer, but preferably it is a transfer film comprising no backing and/or carrier layer. The PSA usually has protective foils on the adhesive layers, which must be removed prior to application. In the example the PSA layer 6 is PMMA based and has a refractive index $n_1=1.5015$ and an average thickness $d_1=30$ μm. The second radiation beam transmissive layer 7 is a sheet of precut PC and has a refractive index $n_2=1.60$ at the used radiation beam wavelength. The average thickness $d_2$ of the second transmissive layer 7 satisfies the equation:

$$d_2 = D(1.60)\left[1 - \frac{30}{D(1.5015)}\right] \pm 0.01 D(1.60) \,\mu m,$$

$$\text{in which } \frac{30}{D(1.5015)} < 1$$

and D(n) represents the thickness versus refractive index function in μm, of a single layer radiation beam transmissive layer causing minimal spherical wavefront aberration in the focal point of the focused radiation beam, said focal point being at the recording layer of the first recording stack 3. This function D(n) for the DVR-blue disc is represented by consecutive connection, with substantially linear line parts, of coordinates (n, D(n)) with the values (1.45, 98.5), (1.50, 98.6), (1.55, 99.2), (1.60, 100), (1.65, 101.1) and (1.70, 102.4). The function D(n) for DVR-blue is shown in FIG. 4. Thus D(1.60)=100 μm and D(1.5015)=98.6 μm. This yields for $d_2$ the target value of 69.57 μm. The PSA layer 6 may be applied by removing a first protective foil from a first side of the precut PSA layer 6, laminating it, with a roller or, preferably, under vacuum, onto the substrate 1 that has already deposited onto it the recording stack 3. Hereafter a second protective foil is removed from the second side of the PSA layer 6 and the PC sheet 7 is laminated, with a roller or, preferably, under vacuum, on top of the PSA layer 6. Subsequently the PC sheet 7 may require trimming in order to match the shape of the substrate 1. Thus the total thickness of the double cover layer is 99.57 μm being the sum of the thicknesses of the PSA layer 6 and the PC sheet 7. As already indicated earlier the $k^{th}$ transmissive layer is not necessarily the last applied PC sheet 7 and may also be PSA layer 6. In this case a PC sheet 7 having a thickness of 70 μm, or any other commercially available thickness, may be chosen and the thickness of the PSA layer 6 may subsequently be calculated with the formula according to the invention. However the method and order of depositing or applying layer 6 and 7 is the same as described above.

Exemplary Embodiment 3

Figure 3:
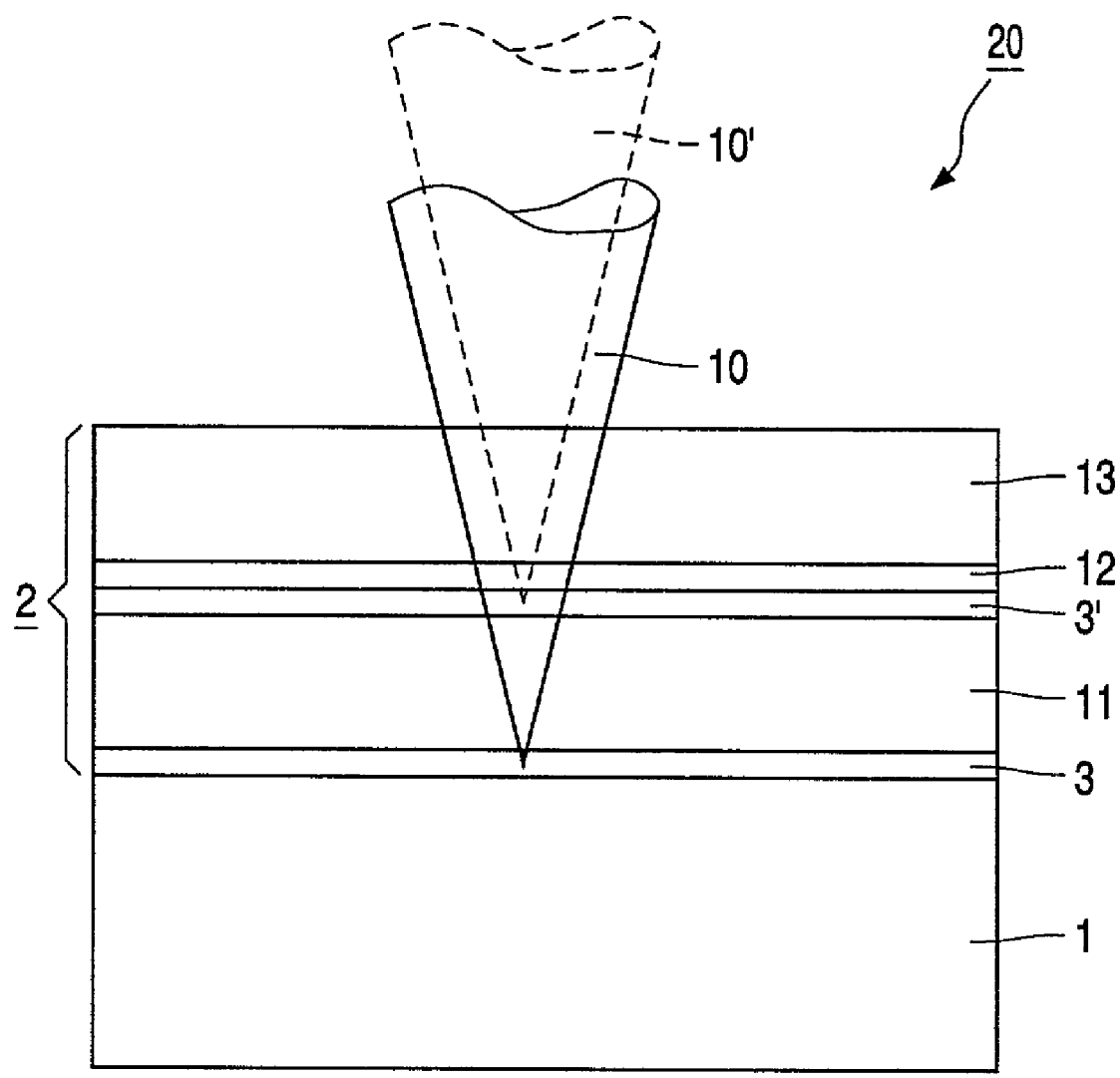

In FIG. 3 a third exemplary embodiment, according to the DVR-blue format but with an additional second recording stack, of the optical information medium 20 for erasable recording is shown. A radiation beam 10, which has a radiation wavelength λ of 405 nm and a numerical aperture NA of 0.85, is focused into the medium 20. The medium 20 has a substrate 1 and a stack 2 of layers provided thereon. The stack 2 comprises a first recording stack 3, a second recording stack 3' and three radiation beam transmissive layers 11, 12, 13.

The first recording stack 3 with an IPIM structure, in analogy with exemplary embodiment 1, comprises, in this order:
 a dielectric layer of $(ZnS)_{80}(SiO_2)_{20}$ with a thickness of 30 nm,
 a recording layer of the compound $GeSb_2Te_4$ with a thickness of 25 nm,
 a dielectric layer of $(ZnS)_{80}(SiO_2)_{20}$ with a thickness of 15 nm,
 an aluminum mirror layer adjacent the substrate with a thickness of 100 nm.

The second recording stack 3' with an IPIMI$^+$ structure, in analogy with exemplary embodiment 1 but with an added extra dielectric layer I$^+$, comprises, in this order:
 a dielectric layer of $(ZnS)_{80}(SiO_2)_{20}$ with a thickness of 30 nm,
 a recording layer of the compound $GeSb_2Te_4$ with a thickness of 6 nm,
 a dielectric layer of $(ZnS)_{80}(SiO_2)_{20}$ with a thickness of 15 nm,
 a transparent silver layer with a thickness of 15 nm,
 a further dielectric layer I$^+$ of AlN with a thickness of 130 nm.

First transmissive layer is a Pressure Sensitive Adhesive (PSA) layer 11, which is commercially available, by e.g.

3M. The PSA layer 11 may comprise a transparent backing and/or carrier layer such as, for example, optionally surface treated, amorphous polymer layers such as polyethylene terephtalate (PET), PC or polymethylmethacrylate (PMMA) layers carrying on each side an adhesive layer, but preferably it is a transfer film comprising no backing and/or carrier layer. The PSA layer 11 usually has protective foils on the adhesive layers, which must be removed prior to application. In the example the PSA layer 11 is PMMA based and has a refractive index $n_1=1.5015$ and an average thickness $d_1=26$ µm. The second transmissive layer 12 is made of a UV curable resin, e.g. Daicure EX-860 provided by Dainippon Ink and Chemicals, and has a refractive index $n_2=1.52$ at the used radiation beam wavelength, and an average thickness $d_2=4$ µm. The third radiation beam transmissive layer 13 is a sheet of precut PC and has a refractive index $n_3=1.60$ at the used radiation beam wavelength. The average thickness $d_3$ of the third transmissive layer 13 satisfies the equation:

$$d_3 = D(1.60)\left[1 - \frac{26}{D(1.5015)} - \frac{4}{D(1.52)}\right] \pm 0.01 D(1.60)\,\mu m,$$

$$\text{in which } \frac{26}{D(1.5015)} + \frac{4}{D(1.52)} < 1$$

and D(n) represents the thickness versus refractive index function in µm, of a single layer radiation beam transmissive layer causing minimal spherical wavefront aberration in the focal point of the focused radiation beam, said focal point being at the recording layer of the first recording stack 3. This function D(n) for the DVR-blue disc is represented by consecutive connection, with substantially linear line parts, of coordinates (n, D(n)) with the values (1.45, 98.5), (1.50, 98.6), (1.55, 99.2), (1.60, 100), (1.65, 101.1) and (1.70, 102.4). The function D(n) for DVR-blue is shown in FIG. 4. Thus $D(1.60)=100$ µm, $D(1.5015)=98.6$ µm and $D(1.52)=98.84$ µm, which value is determined by linear interpolation. This yields for $d_3$ the target value 69.58 µm. Thus the total thickness of the transmissive layers, neglecting the auxiliary transmissive layers in the recording stack 3 and 3', is 99.58 µm being the sum of the thicknesses of the PSA layer 11, UV resin layer 12 and PC sheet 13. It should be noted that when reading out or writing into the recording layer of the second recording stack 3' is performed, the focal point of the focused radiation beam 10 has to be moved to the level of the recording layer of recording stack 3'. This is indicated in FIG. 3 by a dashed line radiation beam 10'. Since radiation beam 10' now only focuses through the UV resin layer 12 and PC sheet 13 a considerable amount of spherical aberration will be present at the focal point of radiation beam 10'. This has to be corrected for by the optical system of the read/write unit, which focuses the radiation beam 10'.

According to the invention an optical information medium for recording, such as e.g. DVR-blue, and a method for manufacturing such a medium is provided. Reading from and recording onto the medium is performed by means of a focused radiation beam having a radiation wavelength λ and a numerical aperture NA. Said medium has a substrate, a stack of layers provided thereon. The stack comprises at least a first recording stack and k radiation beam transmissive layers. Each transmissive layer having a refractive index $n_i$ and an average thickness $d_i$ µm and $1 \leq i \leq k$ and $k \geq 2$. The thickness $d_k$ of layer k is determined by a simple formula which depends on the parameters $n_i$ for $i=1 \ldots k$ and $d_i$ for $i=1 \ldots k-1$. Such a medium has substantially zero spherical aberration at the focal point, being at the recording layer of the first recording stack, of said radiation beam.

The invention claimed is:

1. An optical information medium for recording by means of a focused radiation beam having a radiation wavelength · and a numerical aperture NA, said medium having a substrate, a stack of layers provided thereon, the stack comprising at least a first recording stack and k radiation beam transmissive layers, each radiation beam transmissive layer having a refractive index $n_i$ and an average thickness $d_i$·m and 1·i·k and k·2, characterized in that the average thickness $d_k$ of transmissive layer k satisfies the equation $$d_k = D(n_k)\left[1 - \sum_{i=1}^{k-1} \frac{d_i}{D(n_i)}\right] \pm 0.01 D(n_k) \bullet m,$$

$$\text{in which } \sum_{i=1}^{k-1} \frac{d_i}{D(n_i)} < 1$$

and D(n) represents the thickness versus refractive index function in ·m, of a single layer radiation beam transmissive layer causing minimal spherical wavefront aberration in the focal point of the focused radiation beam, said focal point being at the recording layer of the first recording stack.

2. The optical information medium as claimed in claim 1, characterized in that the refractive index $n_i$ of each of the radiation beam transmissive layers satisfies 1.45·$n_i$·1.70.

3. The optical information medium as claimed in claim 1 or 2, characterized in that $D(1.60)=100\cdot m.$ 4. The optical information medium as claimed in claim 3, characterized in that D(n) is represented by consecutive connection, with substantially linear line parts, of coordinates (n, D(n)) with the values (1.45, 98.5), (1.50, 98.6), (1.55, 99.2), (1.60, 100), (1.65, 101.1) and (1.70, 102.4).

5. The optical information medium as claimed in claim 1 or 2, characterized in that $D(1.60)=300\cdot m.$ 6. The optical information medium as claimed in claim 5, characterized in that D(n) is represented by consecutive connection, with substantially linear line parts, of coordinates (n, D(n)) with the values (1.45, 303.8), (1.50, 301.0), (1.55, 299.9), (1.60, 300), (1.65, 301.1) and (1.70, 303.0).

7. The optical information medium as claimed in claim 1 or 2, characterized in that $$d_k = D(n_k)\left[1 - \sum_{i=1}^{k-1} \frac{d_i}{D(n_i)}\right] \pm 0.001 D(n_k) \bullet m.$$

8. A method of manufacturing an optical information medium for recording by means of a focused radiation beam having radiation wavelength · and a numerical aperture NA, said method comprising the step of:

providing a substrate; and depositing a stack of layers thereon, the stack comprising at least one recording stack and k radiation beam transmissive layers, each radiation beam transmissive layer having a refractive index $n_i$ and average thickness $d_i \cdot m$ and $1 \leq i \leq k$ and $k \geq 2$, characterized in that the step of depositing the $k^{th}$ layer is carried out with an average thickness $d_k$ which is determined by the formula $$d_k = D(n_k)\left[1 - \sum_{i=1}^{k-1} \frac{d_i}{D(n_i)}\right] \pm 0.01 D(n_k) \cdot m,$$

in which $\sum_{i=1}^{k-1} \frac{d_i}{D(n_i)} < 1$ and $D(n)$ represents the thickness versus refractive index function in $\cdot m$, of a single layer radiation beam transmissive layer causing minimal spherical wavefront aberration in the focal point of the focused radiation beam, said focal point being at the recording layer of the first recording stack.

9. The method of manufacturing an optical information medium as claimed in claim 8, characterized in that the refractive index $n_i$ of each of the radiation beam transmissive layers satisfies $1.45 \leq n_i \leq 1.70$.

10. The method of manufacturing an optical information medium as claimed in claim 8 or 9, characterized in that $D(1.60) = 100 \cdot m$.

11. The method of manufacturing an optical information medium as claimed in claim 10, characterized in that $D(n)$ is represented by consecutive connection with substantially linear line parts of coordinates $(n, D(n))$ with the values (1.45, 98.5), (1.50, 98.6), (1.55, 99.2), (1.60, 100), (1.65, 101.1) and (1.70, 102.4).

12. The method of manufacturing an optical information medium as claimed in claim 8 or 9, characterized in that $D(1.60) = 300 \cdot m$.

13. The method of manufacturing an optical information medium as claimed in claim 12, characterized in that $D(n)$ is represented by consecutive connection with substantially linear line parts of coordinates $(n, D(n))$ with the values (1.45, 98.5), (1.50, 98.6), (1.55, 99.2), (1.60, 100), (1.65, 101.1) and (1.70, 102.4).

* * * * *

UNITED STATES PATENT AND TRADEMARK OFFICE
CERTIFICATE OF CORRECTION

PATENT NO. : 7,172,797 B2
APPLICATION NO. : 10/042660
DATED : February 6, 2007
INVENTOR(S) : Bernardus Hendrikus Wilhelmus Hendriks It is certified that error appears in the above-identified patent and that said Letters Patent is hereby corrected as shown below:

IN THE CLAIMS:

Column 10
Claim 1, line 7, change "wavelength ·" to --wavelength $\lambda$--;
  line 12, change "dsub(i)-m and 1 ·i·k and k-2," to --dsub(i) $\mu$m and $1 \leq i \leq k$ and $k \geq 2$,--;
  line 19, at the end of the formula beginning "dsub(i) =D(n,)", change "•m," to --$\mu$m,--;
  line 26, change "function in ·m," to --function in $\mu$m,--.

Column 10
Claim 2, line 34, change "1.45·nsub(i)·1.70." to --$1.45 \leq$ nsub(i) $\leq 1.70$.--.

Column 10
Claim 3, line 38, change "D(1.60)=100-m." to --D(1.60)=100 $\mu$m.--.

Column 10
Claim 5, line 48, change "D(1.60)=300-m." to --D(1.60)=300 $\mu$m.--.

Column 10
Claim 7, line 60, at the end of the formula beginning "dsub(i) =D(n,)", change "•m," to --$\mu$m,--.

Column 10
Claim 8, line 66, change "wavelength ·" to --wavelength $\lambda$--.

Column 11
Claim 8, line 6, change "dsub(i)-m and 1 ·i·k and k-2," to --dsub(i) $\mu$m and $1 \leq i \leq k$ and $k \geq 2$,--;
  line 15, at the end of the formula beginning "dsub(i)= D(n,)", change "•m," to --$\mu$m,--;
  line 21, change "tion in •m," to --tion in $\mu$m,--.

Signed and Sealed this
Seventeenth Day of March, 2015

Michelle K. Lee
*Director of the United States Patent and Trademark Office*

CERTIFICATE OF CORRECTION (continued)
U.S. Pat. No. 7,172,797 B2

Column 12
Claim 9, line 4, change "1.45·nsub(i)·1.70." to --$1.45 \leq \text{nsub}(i) \leq 1.70$.--.

Column 12
Claim 10, line 8, change "D(l.60)=100-m." to --D(1.60)=100 µm.--.

Column 12
Claim 12, line 18, change "D(1.60)=300-m." to --D(1.60)=300 µm.--.

Column 12
Claim 13, lines 23-24, change "the values (1.45, 98.5), (1.50, 98.6), (1.55, 99.2), (1.60, 100), (1.65, 101.1) and (1.70, 102.4)." to --the values (1.45, 303.8), (1.50, 301.0), (1.55, 299.9), (1.60, 300), (1.65, 301.1) and (1.70, 303.0).--.